US009652671B2

(12) United States Patent
Smith et al.

(10) Patent No.: US 9,652,671 B2
(45) Date of Patent: *May 16, 2017

(54) DATA LIFTING FOR EXCEPTION PROCESSING

(71) Applicant: BANK OF AMERICA CORPORATION, Charlotte, NC (US)

(72) Inventors: Michael Gerald Smith, Fort Mill, SC (US); Scott Andrew Johnson, Atlanta, GA (US); Michael Scott Hjellming, Cherryville, NC (US); Brian David Hanson, Charlotte, NC (US); Saravana Kumar Govindarajan, Atlanta, GA (US); Hyunmo Koo, Atlanta, GA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/056,432

(22) Filed: Feb. 29, 2016

(65) Prior Publication Data
US 2016/0180165 A1    Jun. 23, 2016

Related U.S. Application Data

(63) Continuation of application No. 14/066,363, filed on Oct. 29, 2013, now Pat. No. 9,317,745.

(51) Int. Cl.
*G06K 9/00* (2006.01)
*G06K 9/18* (2006.01)

(52) U.S. Cl.
CPC ..... *G06K 9/00469* (2013.01); *G06K 9/00483* (2013.01); *G06K 9/18* (2013.01)

(58) Field of Classification Search
None
See application file for complete search history.

(56) References Cited

U.S. PATENT DOCUMENTS

| 3,125,196 A | 3/1964 | Fenner |
| 3,564,996 A | 2/1971 | Barros |
| 3,574,377 A | 4/1971 | Petitt |
| 4,258,644 A | 3/1981 | Goettert et al. |
| 4,817,176 A | 3/1989 | Marshall et al. |
| 5,097,517 A | 3/1992 | Holt |
| 5,258,855 A | 11/1993 | Lech et al. |

(Continued)

*Primary Examiner* — Weiwen Yang
(74) *Attorney, Agent, or Firm* — Michael A. Springs; Moore & Van Allen PLLC; W. Kevin Ransom

(57) ABSTRACT

Embodiments of the invention include systems, methods, and computer-program products for lifting metadata from financial documents to allow for automated exception processing. As such, allowing for automated decisions for exception processing to systematically be resolved base on matches between lifted metadata. The exceptions may include one or more irregularities such as bad micro line reads, outdated check stock, or misrepresentative checks that may result in a failure to match the check to an associated account for processing. As such, once an exception is identified during the processing the metadata lifted from the document with the exception may be utilized to search financial records at the financial institution to attempt to identify the correct version of the document. Subsequently, the system may correct the irregularity systematically and automatically.

22 Claims, 9 Drawing Sheets

(56) References Cited

U.S. PATENT DOCUMENTS

| | | |
|---|---|---|
| 5,433,483 A | 7/1995 | Yu |
| 5,644,352 A | 7/1997 | Chang et al. |
| 5,668,897 A | 9/1997 | Stolfo |
| 5,704,651 A | 1/1998 | Phillips |
| 5,740,271 A | 4/1998 | Kunkler et al. |
| 5,748,780 A | 5/1998 | Stolfo |
| 5,873,604 A | 2/1999 | Phillips |
| 6,125,196 A | 9/2000 | Carey et al. |
| 6,564,996 B2 | 5/2003 | Hoffman et al. |
| 6,574,377 B1 | 6/2003 | Cahill et al. |
| 7,104,709 B1 | 9/2006 | Maher et al. |
| 7,252,224 B2 | 8/2007 | Verma |
| 7,364,071 B2 | 4/2008 | Esplin et al. |
| 7,494,052 B1 | 2/2009 | Carpenter et al. |
| 7,631,801 B2 | 12/2009 | Sellen et al. |
| 7,729,990 B2 | 6/2010 | Marceau et al. |
| 7,856,403 B2 | 12/2010 | Venturo et al. |
| 7,876,949 B1 | 1/2011 | Oakes, III et al. |
| 8,141,692 B2 | 3/2012 | Spall et al. |
| 8,162,125 B1 | 4/2012 | Csulits et al. |
| 8,165,381 B1 | 4/2012 | Ferris et al. |
| 8,351,677 B1 | 1/2013 | Oakes, III et al. |
| 8,600,789 B1 | 12/2013 | Frew et al. |
| 8,660,984 B1 | 2/2014 | Bhattacharyya et al. |
| 8,768,038 B1 | 7/2014 | Sherman et al. |
| 9,317,745 B2 * | 4/2016 | Smith ............... G06K 9/00469 |
| 2002/0012462 A1 | 1/2002 | Fujiwara |
| 2002/0052852 A1 | 5/2002 | Bozeman |
| 2002/0076093 A1 | 6/2002 | Palmer et al. |
| 2002/0087471 A1 | 7/2002 | Ganesan et al. |
| 2002/0091945 A1 | 7/2002 | Ross |
| 2003/0059098 A1 | 3/2003 | Jones et al. |
| 2003/0177100 A1 | 9/2003 | Filatov |
| 2004/0136586 A1 | 7/2004 | Okamura |
| 2004/0167838 A1 | 8/2004 | Pedersen et al. |
| 2004/0254881 A1 | 12/2004 | Kumar et al. |
| 2005/0021456 A1 | 1/2005 | Steele et al. |
| 2005/0021466 A1 | 1/2005 | Buchanan et al. |
| 2005/0125339 A1 | 6/2005 | Tidwell et al. |
| 2005/0163362 A1 | 7/2005 | Jones et al. |
| 2005/0182792 A1 | 8/2005 | Israel et al. |
| 2006/0278724 A1 | 12/2006 | Walker et al. |
| 2007/0235520 A1 | 10/2007 | Smith et al. |
| 2007/0255653 A1 | 11/2007 | Tumminaro et al. |
| 2007/0288382 A1 | 12/2007 | Narayanan et al. |
| 2008/0086421 A1 | 4/2008 | Gilder et al. |
| 2008/0167990 A1 | 7/2008 | Grant |
| 2008/0180750 A1 | 7/2008 | Feldman |
| 2008/0219543 A1 | 9/2008 | Csulits et al. |
| 2008/0247629 A1 | 10/2008 | Gilder et al. |
| 2009/0114716 A1 | 5/2009 | Ramachandran |
| 2009/0141962 A1 | 6/2009 | Borgia et al. |
| 2009/0144129 A1 * | 6/2009 | Grouf ............... G06F 17/3005 705/14.42 |
| 2009/0222364 A1 | 9/2009 | McGlynn et al. |
| 2009/0276368 A1 | 11/2009 | Martin et al. |
| 2009/0285471 A1 | 11/2009 | Wall et al. |
| 2010/0082470 A1 | 4/2010 | Walach et al. |
| 2010/0296719 A1 | 11/2010 | Williamson et al. |
| 2011/0087598 A1 | 4/2011 | Bozeman |
| 2011/0170740 A1 | 7/2011 | Coleman |
| 2011/0208588 A1 | 8/2011 | Joa et al. |
| 2013/0315467 A1 | 11/2013 | Hawkins |
| 2014/0270462 A1 | 9/2014 | Narendra et al. |
| 2016/0180168 A1 | 6/2016 | Smith et al. |

* cited by examiner

DATA LIFTING FOR EXCEPTION PROCESSING

CROSS-REFERENCE TO RELATED APPLICATIONS

The present application is a continuation application of U.S. non-provisional patent application Ser. No. 14/066,363, filed Oct. 29, 2013 of the same title; the content of which is also incorporated herein by reference in its entirety.

BACKGROUND

With advances in technology, entities and individuals alike are starting to store more and more documents, pictures, illustrations, or other images, electronically. In this way, the space required for paper storage is drastically reduced and image data is being stored on computers or databases.

Entities typically receive large volumes of documents from vendors, customers, or employees on any given day. Each document, especially if it is a financial document, is typically reconciled with an account. In this way, specific characteristics of a document are matched to a corresponding account.

However, sometimes there is no match made between the document and a corresponding account. As such, when an exception occurs, an individual may have to look to other characteristics of the document for reconciliation purposes.

BRIEF SUMMARY

Embodiments of the present invention address the above needs and/or achieve other advantages by providing apparatuses (e.g., a system, computer program product and/or other devices) and methods for lifting metadata off of documents to allow for automated exception processing. As such, allowing for automated decisions for exception processing to systematically resolve exceptions. The exceptions may include one or more irregularities such as bad micro line reads, outdated check stock, or misrepresentative checks that may result in a failure to match the check to an associated account for processing. In some embodiments, the metadata may be used for automated payment stops in response to detecting a suspect document or time. In yet other embodiments, the metadata may be used for automated decisions for detecting and/or eliminating duplicate check processing.

In some embodiments, the system may receive images of financial documents from one or more sources. The financial documents may be received from within an entity, from other financial institutions, or the like. In some embodiments, the images include images of checks or other financial documents captured by an account holder or other entity. From the received financial documents, the system may detect data from the financial record image. This information may be any written or printed information on the front or back of the financial document. The documents may include a myriad of financial documents, including but not limited to checks, lease documents, mortgage documents, deposit slips, payment coupons, receipts, general ledger tickets, or the like.

In the present invention, once the financial document is received, the invention may extract and process the document or the image of the document as metadata. In some embodiments, the system may extract data, in the form of metadata from a text document. The document, which may be a check or the like, may be utilized to extract and/or collect the information associated with the document into metadata instead of image or text data. The invention may then utilize the metadata to further process the received document. The metadata may include information such as an account data, dates, payee, payor, addresses, routing numbers, amounts, document backgrounds, or other information that may be imperative to processing that document. The system may then store the data collected from the document.

In some embodiments, the data collected from the document may be processed and stored as metadata associated with the document. In this way, the image of the document may be captured and the data reprocessed into text or non-image data for storage. As such, numbers, letters, or the like on the document may be captured as part of the document image, but be stored as text data.

In some embodiments, the system may extract the data from financial document images or other image data. This data may be lifted off of the financial documents and extracted as metadata. Metadata is data about the image data found on a financial document, such as a check, or the like. In some embodiments, the data may be structural metadata. As such, the data may be about the design and specification of the structure of the data. In other embodiments, the data may be descriptive metadata. As such, the data may be data describing in detail the content of the financial record or document. In some embodiments, the metadata as described herein may take the form of structural, descriptive and/or a combination thereof.

In order to extract the metadata from one or more documents or images optical character recognition may be utilized. In this way, optical character recognition may be used to extract the metadata from financial documents, such as text documents and financial record images, such as checks or other financial instruments.

In some embodiments, the metadata extracted from the financial documents can be used in processing or automating transactions, implementing business strategies, and providing enhanced online account information to customers.

Specifically, in some embodiments the extracted metadata is utilized to allow for automated decisions for exception processing to systematically resolve exceptions. The exceptions may include one or more irregularities such as bad micro line reads, outdated check stock, or misrepresentative checks that may result in a failure to match the check to an associated account for processing. As such, once an exception is identified during the processing the metadata lifted from the document with the exception may be utilized to search financial records at the financial institution to attempt to identify the correct version of the document. Subsequently, the system may correct the irregularity systematically and automatically.

In other some embodiments, the extracted metadata may be used for automated payment stops in response to detecting a suspect document or time. As such, the system may receive information about a document that a user may wish to stop a payment on. As such, the system may use this information and match it to metadata lifted off of financial documents. The information received will match up to metadata lifted from the financial document. As such, the system will put a stop payment on the financial document identified.

In yet other embodiments, the metadata may be used for automated decisions for detecting and/or eliminating duplicate check processing. In this way, the system will lift metadata associated with a financial document received. The metadata may then be compared to metadata from previous financial documents received. If there exists an exact match between the two sets of metadata the invention will notify the user and identify the duplicate financial document. Furthermore, the system will eliminate the duplicate if necessary.

Embodiments of the invention relate to systems, methods, and computer program products for exception processing of financial documents, the invention comprising: receiving an indication of a user transaction, wherein receiving an indication of the user transaction comprises receiving a copy of the financial documents associated with the user transaction for processing; identifying data from the financial document, wherein the data from the financial document is extracted from the financial document using optical character recognition and the data is stored as metadata; processing the financial document, wherein processing includes identifying exceptions in the financial documents being processing; comparing the extracted metadata from the financial document comprising exceptions to known data associated with financial accounts; matching an appropriate financial account to the financial document comprising exceptions, wherein the match is based on the comparison between the extracted metadata from the financial document comprising exceptions to known data associated with financial accounts; and replacing the exception and allow the financial document comprising the exception to be processed.

In some embodiments, processing the financial documents further comprises directing a financial document without an exception to an appropriate financial account associated with the financial document such that payment for the user transaction associated with the financial document is completed.

In some embodiments, comparing the extracted metadata from the financial document comprising exceptions to known data associated with financial accounts further comprises: compiling metadata associated with complete portions of the financial document comprising exceptions; compiling metadata associated with partially extracted portions or exception portion from the financial document comprising exceptions; compare both the metadata associated with complete portions of the financial document and metadata associated with partially extracted portions of the financial document to known data associated with financial accounts; and determine a match between a known financial account and the financial document comprising exceptions based on the comparison of both complete and partial portions of the financial document comprising exceptions.

In some embodiments, identifying data from the transaction documents associated with the user transaction further comprises capturing via optical character recognition, images of various elements of the transaction documents, wherein the various elements are unique to the transaction documents, wherein the identified data is stored as metadata.

In some embodiments, elements of the financial document that comprise the identified data includes one or more of a payor name, a payee name, date, payment amount, account number, or routing number.

In some embodiments, the financial documents comprise one or more of a check, deposit ticket, automated teller machine (ATM) receipt, or general ledger ticket.

In some embodiments, exceptions comprise one or more irregularities in the financial documents such as bad micro line reads, outdated check stock, or misrepresentative checks.

In some embodiments, metadata comprises both structural and descriptive metadata, wherein the structural and descriptive metadata includes design, specification, and details from the financial document relating to one or more of account data, dates, payee, payor, addresses, routing numbers, or payment amounts.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
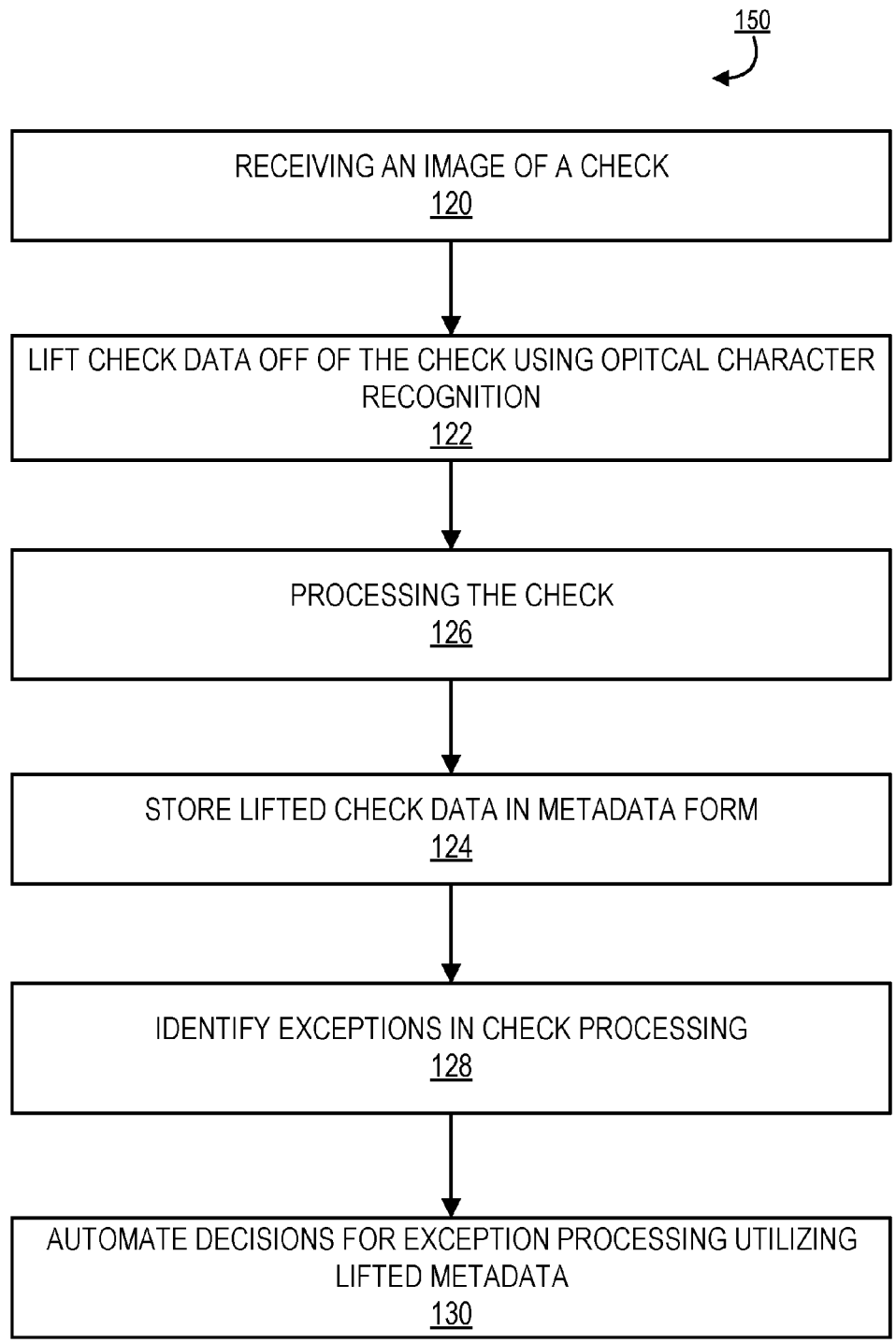
Figure 1B:
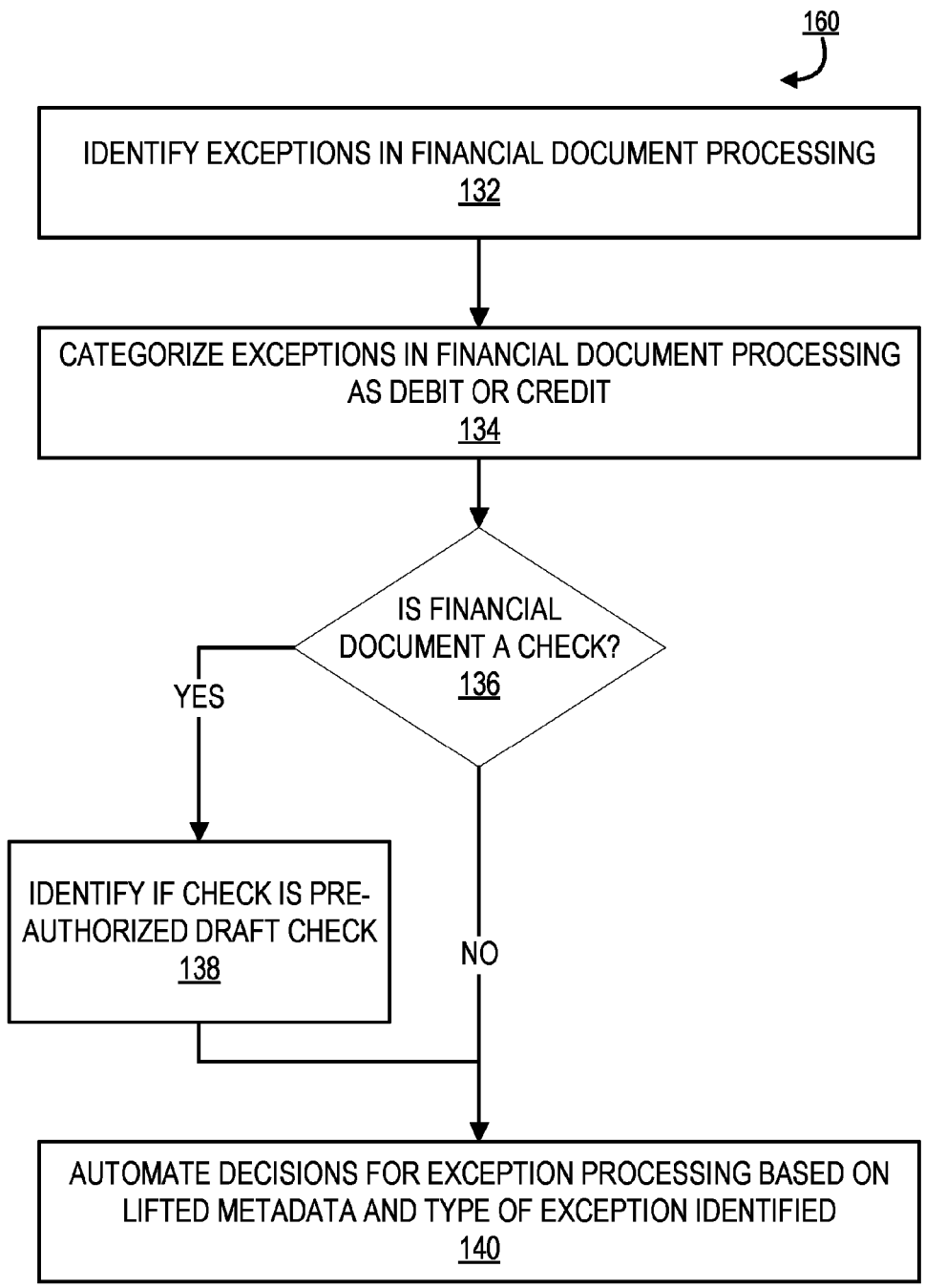
Figure 2:
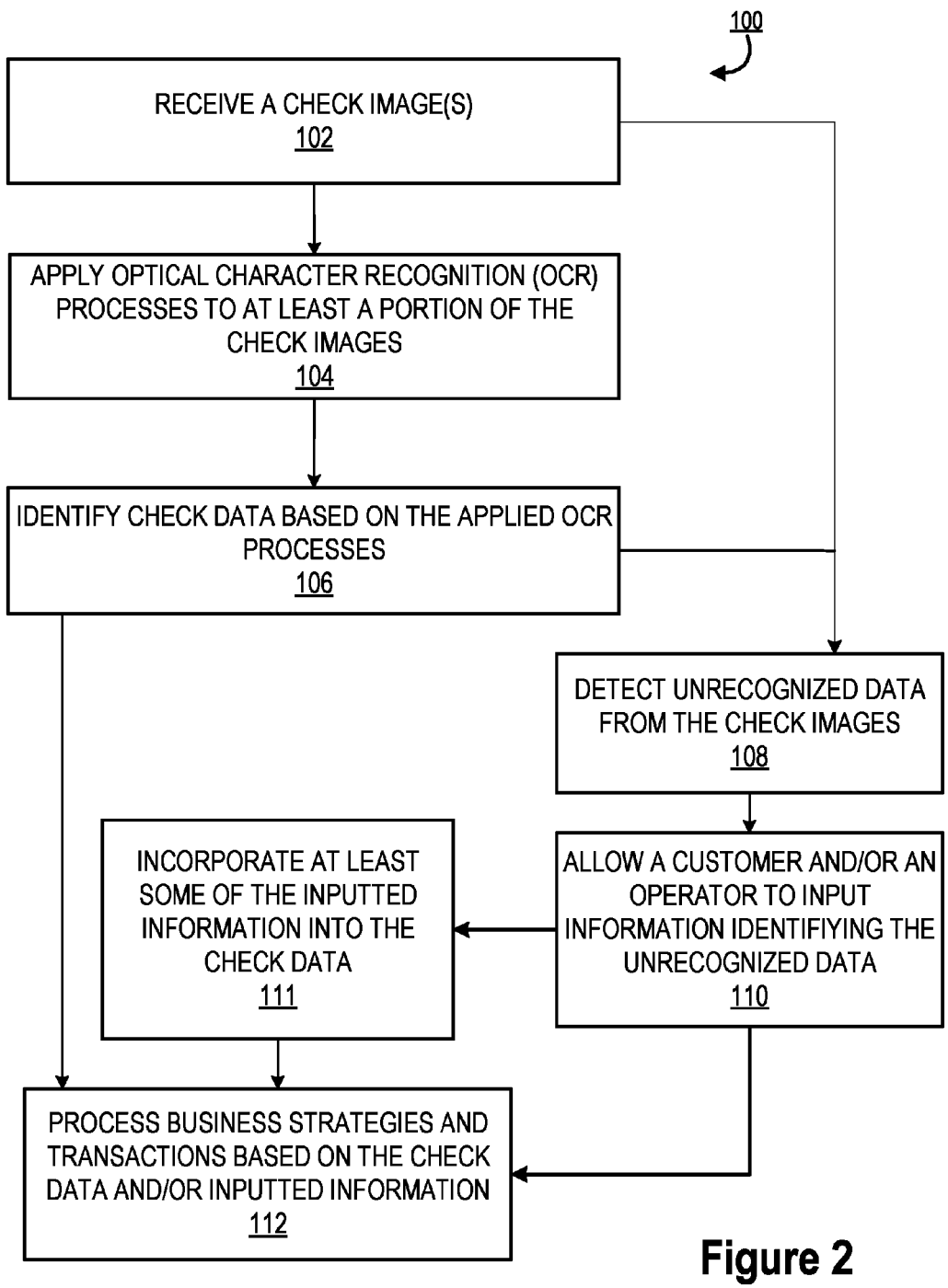
Figure 3:
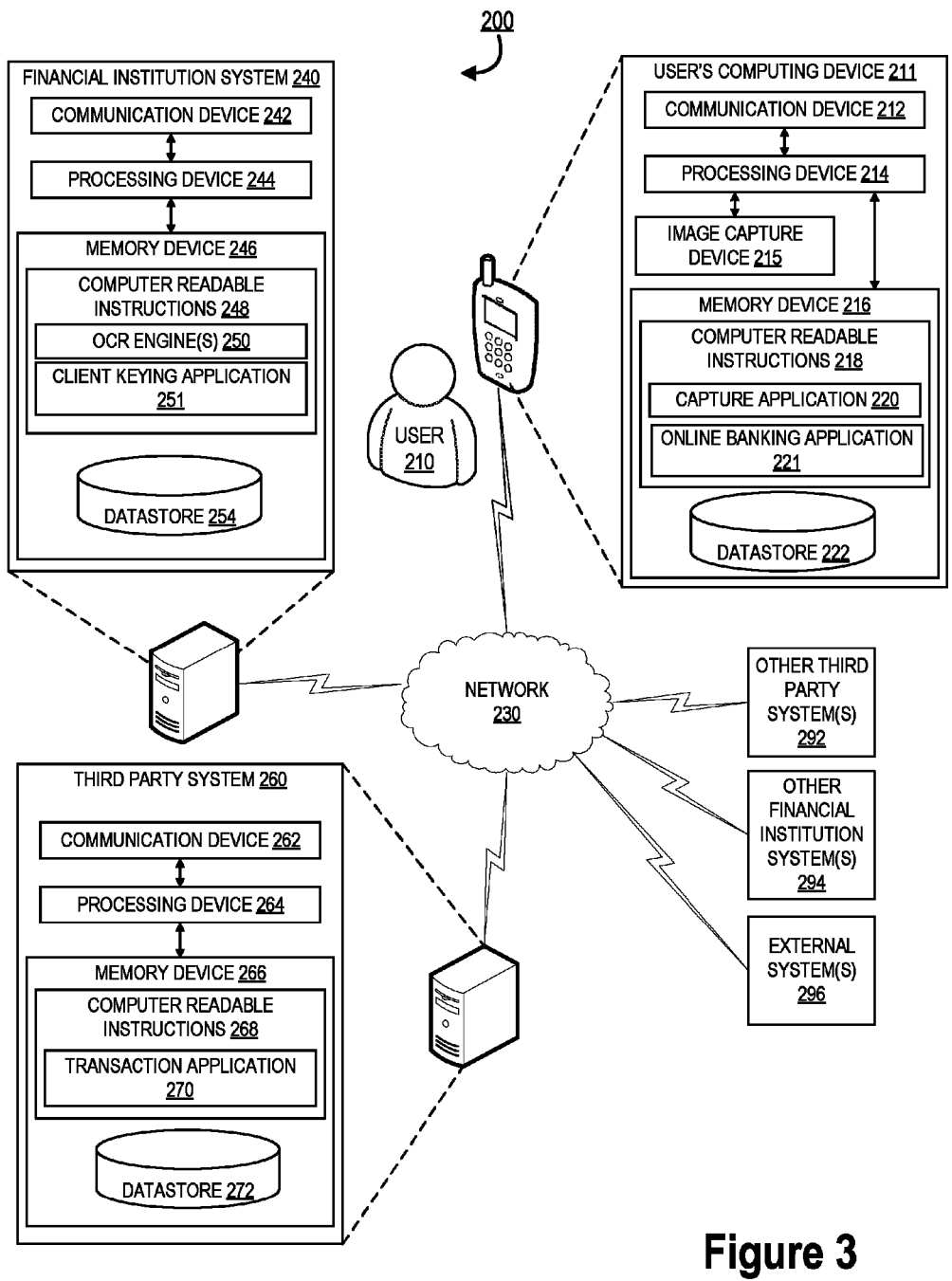
Figure 4:
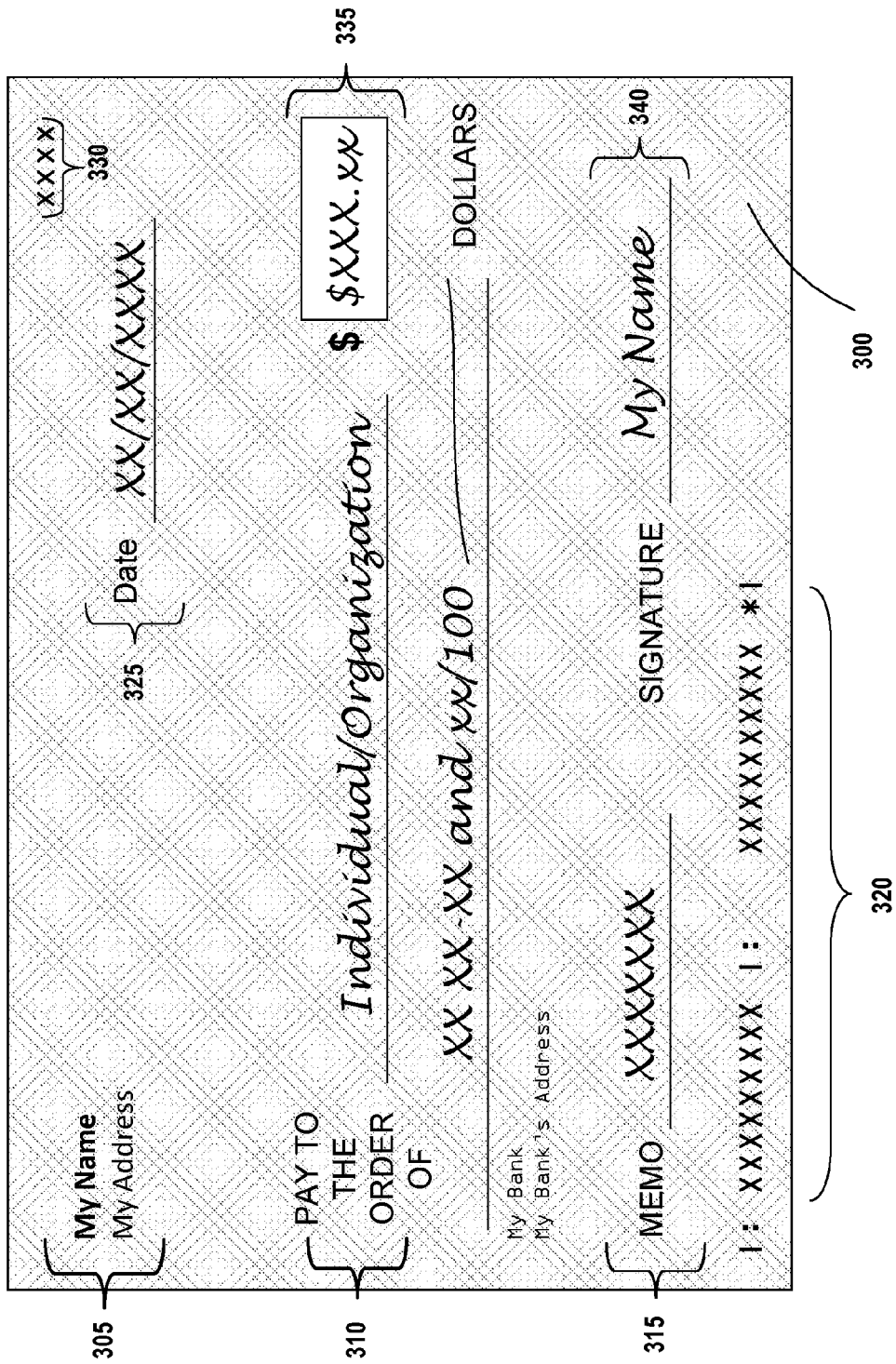
Figure 5:
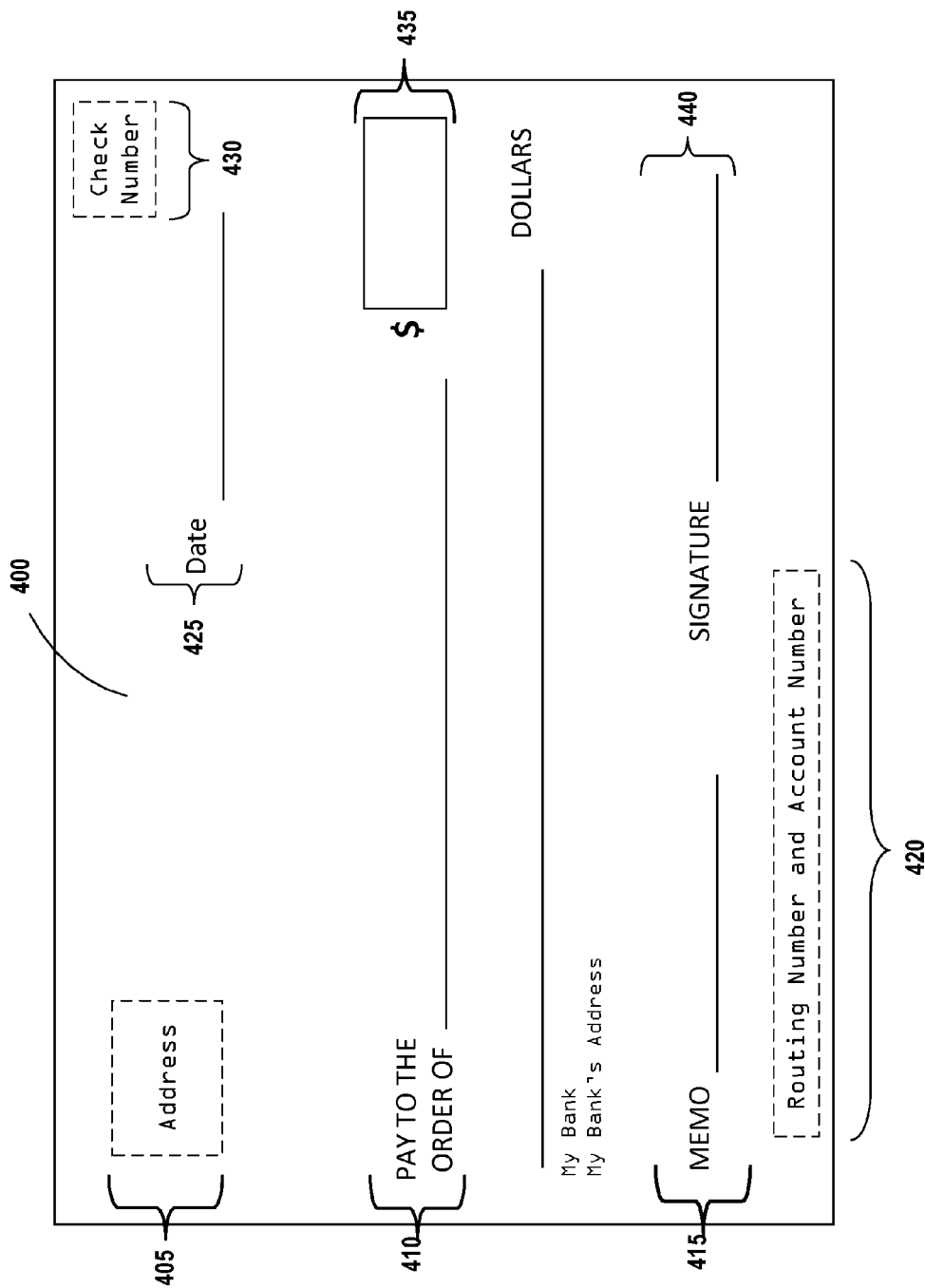
Figure 6:
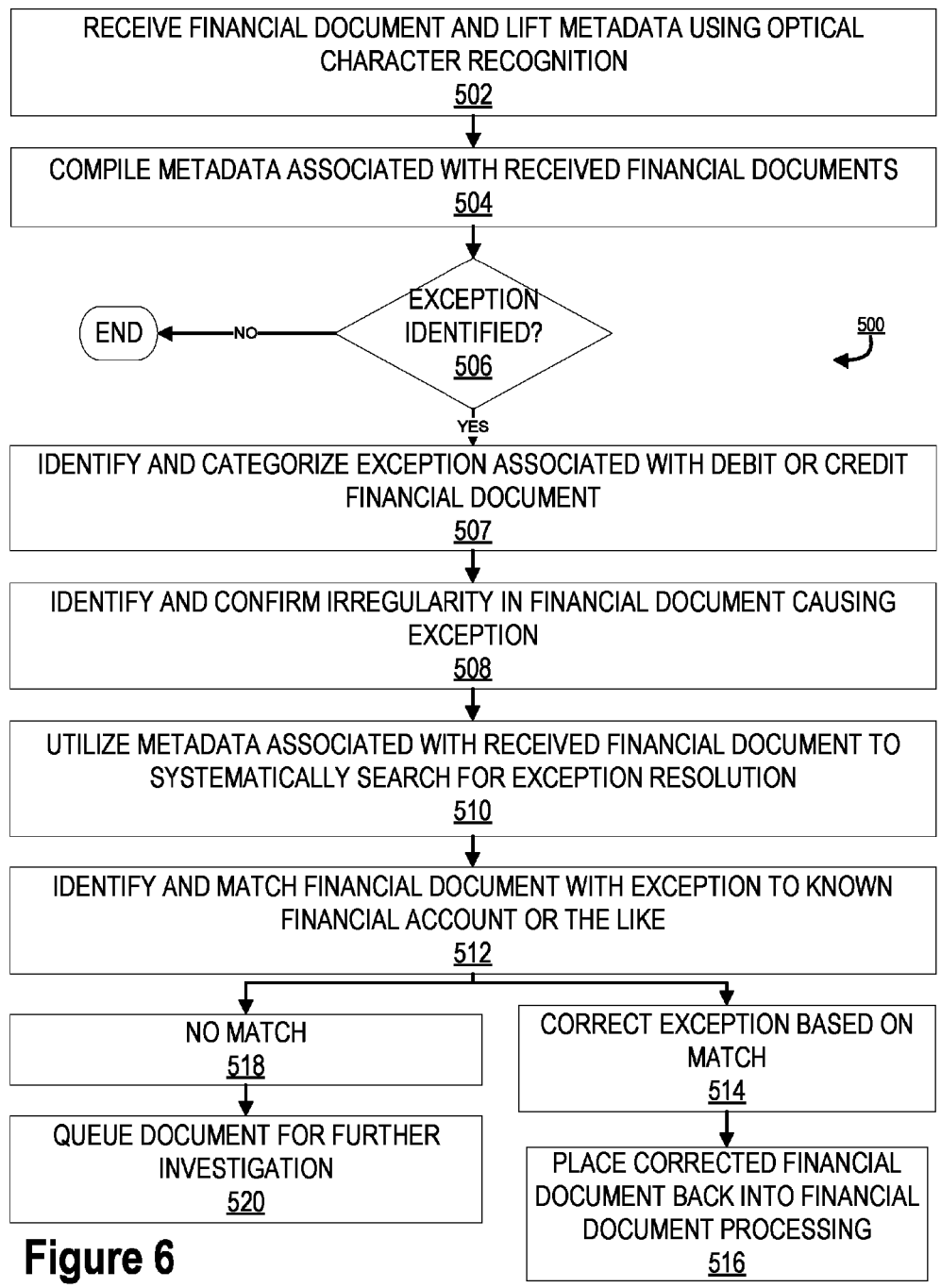
Figure 7:
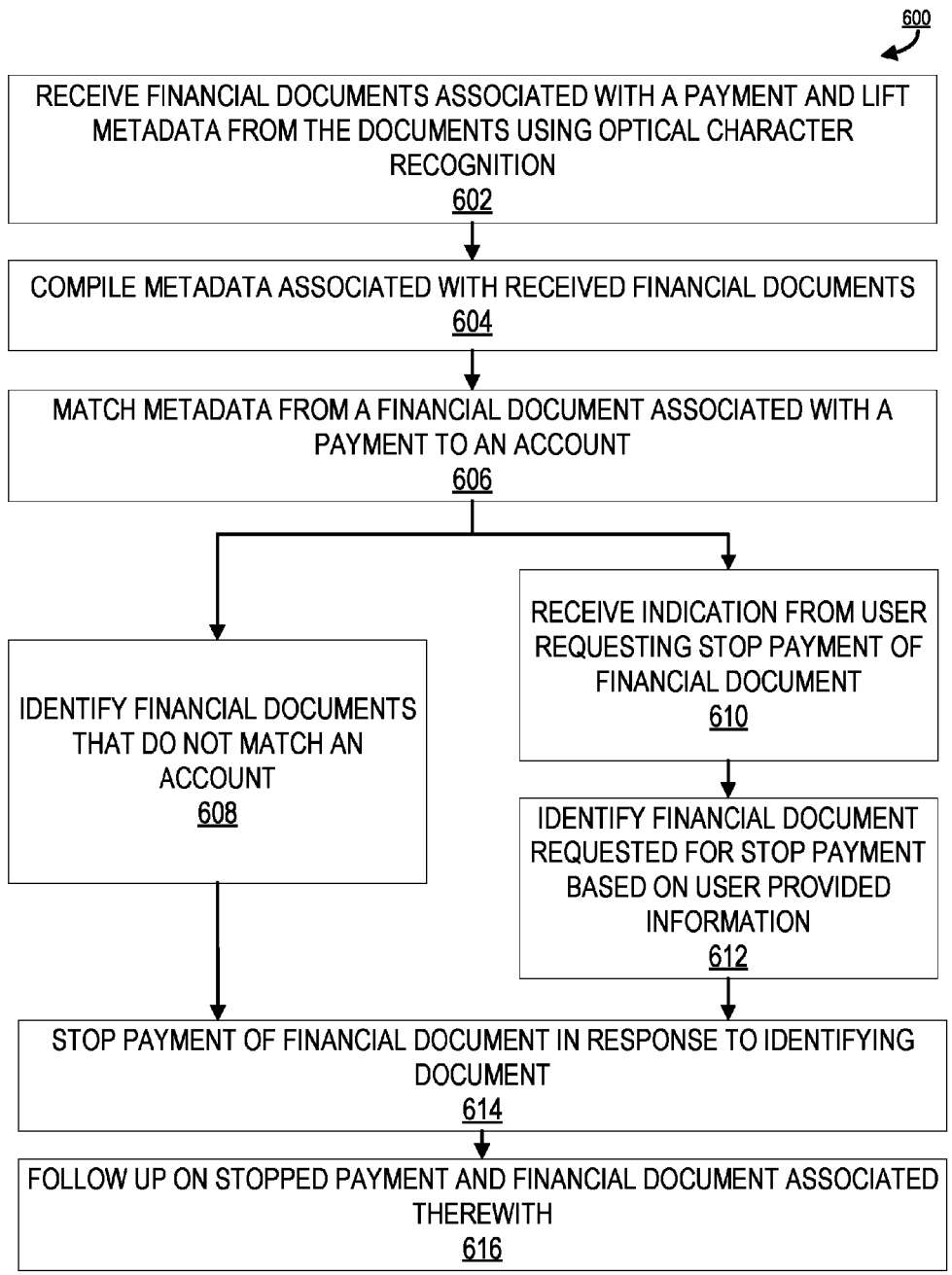
Figure 8:
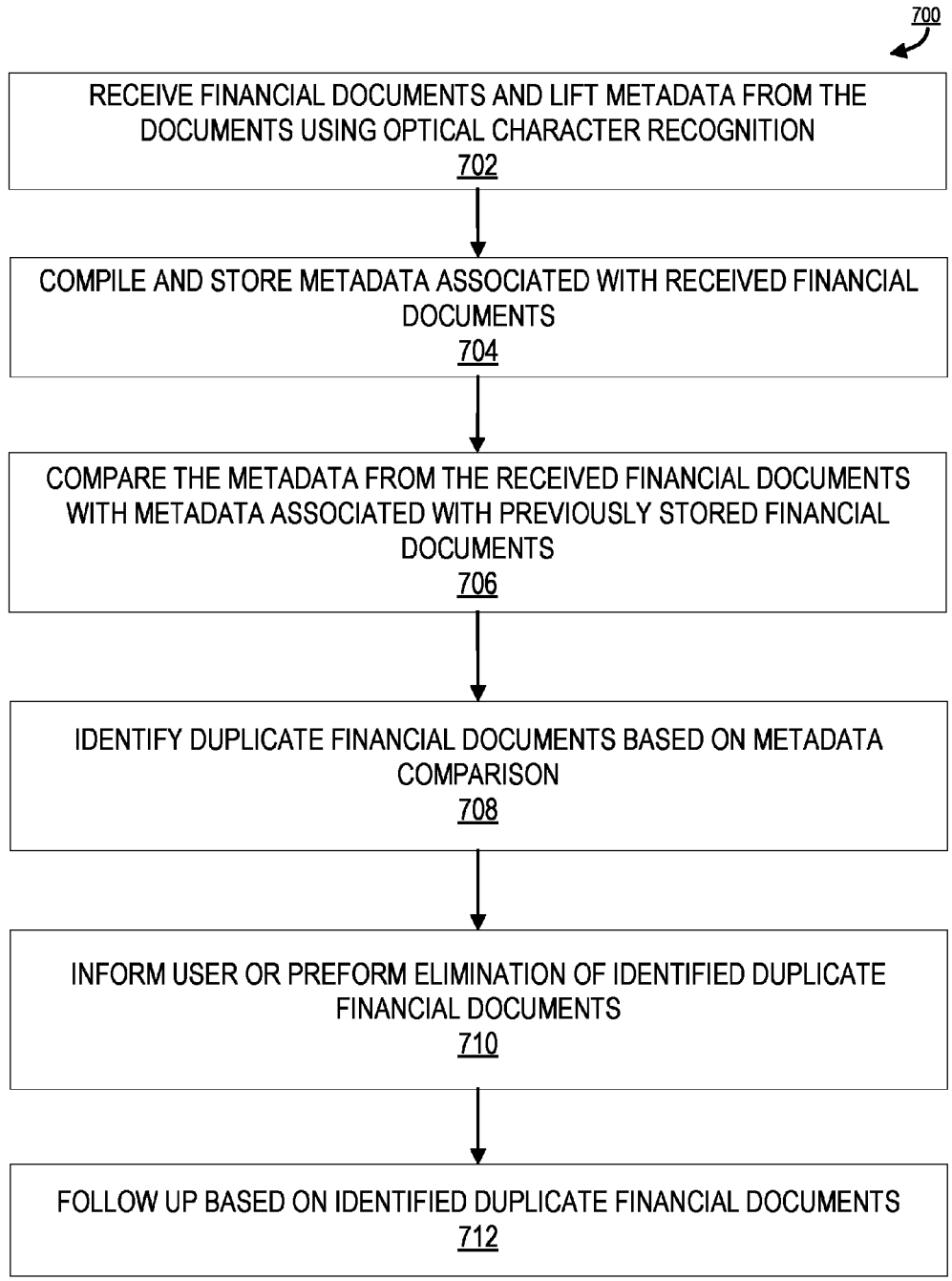

Having thus described embodiments of the invention in general terms, reference will now be made to the accompanying drawings, wherein:

FIG. 1A provides a high level process flow illustrating general data lifting for image document exception processing, in accordance with one embodiment of the present invention;

FIG. 1B provides a high level process flow illustrating general data lifting for image document exception processing, in accordance with one embodiment of the present invention;

FIG. 2 provides a high level process flow illustrating identifying and extracting financial record data as metadata, in accordance with one embodiment of the present invention;

FIG. 3 provides a data lifting for image document exception processing system environment, in accordance with one embodiment of the present invention;

FIG. 4 illustrates an exemplary image of a financial record, in accordance with one embodiment of the present invention;

FIG. 5 provides an exemplary template of a financial record, in accordance with one embodiment of the present invention;

FIG. 6 provides a process flow illustrating metadata lift and utilization for exception processing, in accordance with one embodiment of the present invention;

FIG. 7 provides a process flow illustrating metadata lift and utilization for stop payment processing, in accordance with one embodiment of the present invention; and FIG. 8 provides a process flow illustrating metadata lift and utilization for duplicate identification and processing, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. As used herein, a "document" or "financial record" may also refer to a myriad of financial documents, including but not limited to a lease document, a mortgage document, a deposit slip, a payment coupon, a receipt, general ledger tickets, or the like. In some embodiments, "document" or "financial record" may exist as a physical item printed on paper or other medium. In other embodiments, the check may exist electronically. Furthermore, "document" or "financial record" may also refer to records associated with government data, legal data, identification data, and the like. Although the disclosure is directed to financial records, it will be understood that non-financial records such as social communications, advertising, blogs, opinion writing, and the like may also be applicable to the disclosure presented herein. In cases were non-financial records are use, it will be understood that personal information, such personal identifying information, account numbers, and the like, can be removed from the documents before they are released. For example, if a coupon or product review is to be used in advertising, personal information associated with such records will be removed before the advertising is presented to the public. The data of the financial records or non-financial records may be provided in a wide variety formats including, paper records, electronic or digital records, video records, audio records, and/or combinations thereof. In some embodiments, the "document" or "financial record" may be referred to in examples as a check or the like.

Furthermore, the term "image lift data" or "data lift" may refer to the process of lifting one or more areas/elements of a document and storing those areas as metadata without storing the entire document as an image file.

Some portions of this disclosure are written in terms of a financial institution's unique position with respect document processing and retrieving. As such, a financial institution may be able to utilize its unique position to receive, store, process, and retrieve images of documents, such as those of a financial nature.

As presented herein, embodiments that detect and extract specific data from images and that analyze, process, and distribute extracted metadata are provided.

Referring now to FIG. 1A, FIG. 1A presents provides a high level process flow for general data lifting for image document exception processing 150, in accordance with some embodiments of the invention. At block 120, the method comprises receiving an image of a check. The image received may be one or more of a check or other document or financial record. In some embodiments, the image of the check may be received by an apparatus (e.g. a computer system) via a user's mobile device, a camera, an Automated Teller Machine (ATM) at one of the entity's facilities, a second apparatus at a teller's station, or the like. In other embodiments, the apparatus may be configured to capture the image of the check.

As illustrated in block 122, the system may then lift data off of the check (document or financial record) using optical character recognition (OCR). The OCR processes enables the system to convert text and other symbols in the check images to other formats such as text files and/or metadata, which can then be used and incorporated into a variety of applications, documents, and processes. In some embodiments, OCR based algorithms used in the OCR processes incorporate pattern matching techniques. For example, each character in an imaged word, phrase, code, or string of alphanumeric text can be evaluated on a pixel-by-pixel basis and matched to a stored character. Various algorithms may be repeatedly applied to determine the best match between the image and stored characters.

After the successful retrieval or capture of the image of the check, the apparatus may process the image of the check as illustrated in block 126. The apparatus may capture individual pieces of check information from the image of the check in metadata form. In some embodiments, the check information may be text. In other embodiments, the check information may be an image processed into a metadata format.

As illustrated in block 124, the method comprises storing the check information in a metadata form. After the image of the check is processed, the apparatus may store the lifted and collected check information as metadata. In some embodiments, the check information may be stored as metadata. As such, individual elements of the check information may be stored separately, and may be associated with each other via metadata. In some embodiments, the individual pieces of check information may be stored together. In some embodiments, the apparatus may additionally store the original image of the check immediately after the image of the check is received.

As illustrated in block 128, the process 150 continues by identifying exceptions in the document processing. Exceptions may be one or more of irregularities such as bad micro line reads, outdated document stock, misrepresented items, or the like that result in a failure to match the document to an account. In some embodiments, the process may also detect duplicate documents. In yet other embodiments, the system may identify payment stops for specific documents.

Next, as illustrated in block 130, the process 150 continues to provide automated decisions for exception processing utilizing the lifted metadata. In this way, the system may utilize the metadata lifted from the document in order to rectify the exception identified in block 128. In this way, the system may be able to rectify the exception without having to have an individual manually override the exception and identify the account associated with the document with the exception.

Referring now to FIG. 1B, FIG. 1B presents provides a high level process flow for general data lifting for image document exception processing 160, in accordance with some embodiments of the invention. As illustrated in block 132, the process 160 starts by identifying the exceptions in financial document processing. Once identified, the documents associated with each of the one or more exceptions may be categorized as either debit or credit documents, as illustrated in block 134. In this way, the system may identify an exception and identify the type of document that the exception was identified from.

Next, as illustrate in decision block 136, the system may identify if the document is a check or if it is another financial document for processing. If the financial document is a check in decision block 136, the system will identify if the check is a pre-authorized draft check. In some embodiments, pre-authorized draft checks are made via online purchases that ask a user for his/her check number and routing number. The pre-authorized draft check is subsequently converted to paper form and submitted to the financial institution for processing. These pre-authorized draft checks may undergo a higher level of processing scrutiny to ensure authenticity, if necessary.

Finally, as illustrated in block 140, automated decisions are created for the financial documents with exceptions based on lifted metadata and the type of exception identified.

Referring now to FIG. 2, FIG. 2 provides a flowchart illustrating a process 100 for identifying and extracting data from check images. One or more devices, such as the one or more systems and/or one or more computing devices and/or servers of FIG. 3 can be configured to perform one or more steps of the process 100 or other processes described below. In some embodiments, the one or more devices performing the steps are associated with a financial institution. In other embodiments, the one or more devices performing the steps are associated with a merchant, business, partner, third party, credit agency, account holder, and/or user.

As illustrated at block 102, one or more check images are received. The check images comprise the front portion of a check, the back portion of a check, or any other portions of a check. In cases where there are several checks piled into a stack, the multiple check images may include, for example, at least a portion of each of the four sides of the check stack. In this way, any text, numbers, or other data provided on any side of the check stack may also be used in implementing the process 100.

In some embodiments, each of the check images comprises financial record data. The financial record data includes dates financial records are issued, terms of the financial record, time period that the financial record is in effect, identification of parties associated with the financial record, payee information, payor information, obligations of parties to a contract, purchase amount, loan amount, consideration for a contract, representations and warranties, product return policies, product descriptions, check numbers, document identifiers, account numbers, merchant codes, file identifiers, source identifiers, and the like.

Although check images are illustrated in FIG. 2, it will be understood that any type of financial record image may be received in accordance with the embodiments of FIG. 2. Exemplary check images include PDF files, scanned documents, digital photographs, and the like. At least a portion of each of the check images, in some embodiments, is received from a financial institution, a merchant, a signatory of the financial record (e.g., the entity having authority to endorse or issue a financial record), and/or a party to a financial record. In other embodiments, the check images are received from image owners, account holders, agents of account holders, family members of account holders, financial institution customers, payors, payees, third parties, and the like. In some embodiments, the source of at least one of the checks includes an authorized source such as an account holder or a third party financial institution. In other embodiments, the source of at least one of the checks includes an unauthorized source such as an entity that intentionally or unintentionally deposits or provides a check image to the system of process 100.

In some exemplary embodiments, a customer or other entity takes a picture of a check at a point of sales or an automated teller machine (ATM) and communicates the resulting check image to a point of sales device or ATM via wireless technologies, near field communication (NFC), radio frequency identification (RFID), and other technologies. In other examples, the customer uploads or otherwise sends the check image to the system of process 100 via email, short messaging service (SMS) text, a web portal, online account, mobile applications, and the like. For example, the customer may upload a check image to deposit funds into an account or pay a bill via a mobile banking application using a capture device. The capture device can include any type or number of devices for capturing images or converting a check to any type of electronic format such as a camera, personal computer, laptop, notebook, scanner, mobile device, and/or other device.

As illustrated at block 104, optical character recognition (OCR) processes are applied to at least a portion of the check images. At least one OCR process may be applied to each of the check images or some of the check images. The OCR processes enables the system to convert text and other symbols in the check images to other formats such as text files and/or metadata, which can then be used and incorporated into a variety of applications, documents, and processes. In some embodiments, OCR based algorithms used in the OCR processes incorporate pattern matching techniques. For example, each character in an imaged word, phrase, code, or string of alphanumeric text can be evaluated on a pixel-by-pixel basis and matched to a stored character. Various algorithms may be repeatedly applied to determine the best match between the image and stored characters.

As illustrated in block 106, the check data may be identified based on the applied OCR processing. In some embodiments, the OCR process includes location fields for determining the position of data on the check image. Based on the position of the data, the system can identify the type of data in the location fields to aid in character recognition. For example, an OCR engine may determine that text identified in the upper right portion of a check image corresponds to a check number. The location fields can be defined using any number of techniques. In some embodiments, the location fields are defined using heuristics. The heuristics may be embodied in rules that are applied by the system for determining approximate location.

In other embodiments, the system executing process flow 100 defines the location fields by separating the portions and/or elements of the image of the check into quadrants. As referred to herein, the term quadrant is used broadly to describe the process of differentiating elements of a check image by separating portions and/or elements of the image of the check into sectors in order to define the location fields. These sectors may be identified using a two-dimensional coordinate system or any other system that can be used for determining the location of the sectors. In many instances, each sector will be rectangular in shape. In some embodiments, the system identifies each portion of the image of the check using a plurality of quadrants. In such an embodiment, the system may further analyze each quadrant using the OCR algorithms in order to determine whether each quadrant has valuable or useful information. Generally, valuable or useful information may relate to any data or information that may be used for processing and/or settlement of the check, used for identifying the check, and the like. Once the system determines the quadrants of the image of the check having valuable and/or useful information, the system can extract the identified quadrants together with the information from the image of the check for storage. The quadrants may be extracted as metadata, text, or code representing the contents of the quadrant. In some embodiments, the quadrants of the image of the check that are not identified as having valuable and/or useful information are not extracted from the image.

In additional embodiments, the system uses a grid system to identify non-data and data elements of a check image. The grid system may be similar to the quadrant system. Using the grid system, the system identifies the position of each grid element using a coordinate system (e.g., x and y coordinates or x, y, and z coordinate system or the like) or similar system for identifying the spatial location of a grid element on a check. In practice, the spatial location of a grid element may be appended to or some manner related to grid elements with check data. For example, using the grid, the system may identify which grid elements of the grid contain data elements, such as check amount and payee name, and either at the time of image capture or extraction of the check image within the grid, the system can tag the grid element having the check data element with the grid element's spatial location. In some embodiments, the grid system and/or quadrant system is based on stock check templates obtained from check manufacturers or merchants (See, e.g., FIG. 5).

In alternative or additional embodiments, the OCR process includes predefined fields to identify data. The predefined field includes one or more characters, words, or phrases that indicate a type of data. In such embodiments, the system of process 100 extracts all the data presented in the check image regardless of the location of the data and uses the predefined fields to aid in character recognition. For example, a predefined field containing the phrase "Pay to the order of" may be used to determine that data following the predefined field relates to payee information.

In addition to OCR processes, the system of process 100 can use other techniques such as image overlay to locate, identify, and extract data from the check images. In other embodiments, the system uses the magnetic ink character recognition (MICR) to determine the position of non-data (e.g., white space) and data elements on a check image. For example, the MICR of a check may indicate to the system that the received or captured check image is a business check with certain dimensions and also, detailing the location of data elements, such as the check amount box or Payee line. In such an instance, once the positions of this information is made available to the system, the system will know to capture any data elements to the right or to the left of the identified locations or include the identified data element in the capture. This system may choose to capture the data elements of a check in any manner using the information determined from the MICR number of the check.

As illustrated at block 108, unrecognized data from the check images is detected. In some embodiments, the unrecognized data includes characters, text, shading, or any other data not identified by the OCR processes. In such embodiments, the unrecognized data is detected following implementation of at least one of the OCR processes. In other embodiments, the unrecognized data is detected prior to application of the OCR processes. For example, the unrecognized data may be removed and separated from the check images or otherwise not subjected to the OCR processes. In one exemplary situation, the system may determine that handwritten portions of a check image should not undergo OCR processing due to the difficulty in identifying such handwritten portions. Exemplary unrecognized data includes handwritten text, blurred text, faded text, misaligned text, misspelled data, any data not recognized by the OCR processes or other data recognition techniques, and the like. In other cases, at least a portion of some or all of the check images may undergo pre-processing to enhance or correct the unrecognized data. For example, if the text of a check image is misaligned or blurry, the system may correct that portion of the check image before applying the OCR processes to increase the probability of successful text recognition in the OCR processes or other image processes.

As illustrated at block 110, inputted information identifying the unrecognized data from a customer and/or an operator is received. In some embodiments, an operator is provided with the portions of a check image corresponding to the unrecognized data. The operator can view the unrecognized data to translate the unrecognized data into text and input the translation into a check data repository. In this way, the system "learns" to recognize previously unrecognized data such that when the system reviews the same or similar unrecognized data in the future, such data can be easily identified by reference to the check data repository. In other embodiments, the system may present an online banking customer with the unrecognized data to solicit input directly from the customer. For example, the customer may be presented with operator-defined terms of previously unrecognized data to verify if such terms are correct. The system may solicit corrective input from the customer via an online banking portal, a mobile banking application, and the like. If an operator initially determines that the handwriting on the memo line reads "house flaps," the customer may subsequently correct the operator's definition and update the check data repository so that the handwritten portion correctly corresponds to "mouse traps." In some embodiments, the customer's input is stored in a customer input repository, which is linked to the check data repository associated with the OCR processes. For example, the system can create a file path linking the customer input repository with the check data repository to automatically update the check data repository with the customer input. In other embodiments, the check data repository and/or customer input repository includes stored customer data or account data. Stored customer signatures, for example, may be included in the check data repository and/or customer input repository.

As illustrated at block 112, business strategies and transactions are processed based on at least one of the check data and the inputted information. Metadata extracted from the check images using the process 100 may be used to automate or enhance various processes such as remediating exception processes, replacing check images with check data in online statements, enforcing requirements regarding third party check deposits, facilitating check to automated clearing house transaction conversion, cross selling products, and so forth.

FIG. 3 illustrates a data lifting for image document exception processing system environment 200, in accordance with some embodiments of the invention. The environment 200 includes a computing device 211 of a user 210 (e.g., an account holder, a mobile application user, an image owner, a bank customer, and the like), a third party system 260, and a financial institution system 240. In some embodiments, the third party system 260 corresponds to a third party financial institution. The environment 200 further includes one or more third party systems 292 (e.g., a partner, agent, or contractor associated with a financial institution), one or more other financial institution systems 294 (e.g., a credit bureau, third party banks, and so forth), and one or more external systems 296.

The systems and devices communicate with one another over the network 230 and perform one or more of the various steps and/or methods according to embodiments of the disclosure discussed herein. The network 230 may include a local area network (LAN), a wide area network (WAN), and/or a global area network (GAN). The network 230 may provide for wireline, wireless, or a combination of wireline and wireless communication between devices in the network. In one embodiment, the network 230 includes the Internet.

The computing device 211, the third party system 260, and the financial institution system 240 each includes a computer system, server, multiple computer systems and/or servers or the like. The financial institution system 240, in the embodiments shown has a communication device 242 communicably coupled with a processing device 244, which is also communicably coupled with a memory device 246. The processing device 244 is configured to control the communication device 242 such that the financial institution system 240 communicates across the network 230 with one or more other systems. The processing device 244 is also configured to access the memory device 246 in order to read the computer readable instructions 248, which in some embodiments includes a one or more OCR engine applications 250 and a client keying application 251. The memory device 246 also includes a datastore 254 or database for storing pieces of data that can be accessed by the processing device 244. In some embodiments, the datastore 254 includes a check data repository.

As used herein, a "processing device," generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 214, 244, or 264 may further include functionality to operate one or more software programs based on computer-executable program code thereof, which may be stored in a memory. As the phrase is used herein, a processing device 214, 244, or 264 may be "configured to" perform a certain function in a variety of ways, including, for example, by having one or more general-purpose circuits perform the function by executing particular computer-executable program code embodied in computer-readable medium, and/or by having one or more application-specific circuits perform the function.

Furthermore, as used herein, a "memory device" generally refers to a device or combination of devices that store one or more forms of computer-readable media and/or computer-executable program code/instructions. Computer-readable media is defined in greater detail below. For example, in one embodiment, the memory device 246 includes any computer memory that provides an actual or virtual space to temporarily or permanently store data and/or commands provided to the processing device 244 when it carries out its functions described herein.

The user's computing device 211 includes a communication device 212 and an image capture device 215 (e.g., a camera) communicably coupled with a processing device 214, which is also communicably coupled with a memory device 216. The processing device 214 is configured to control the communication device 212 such that the user's computing device 211 communicates across the network 230 with one or more other systems. The processing device 214 is also configured to access the memory device 216 in order to read the computer readable instructions 218, which in some embodiments includes a capture application 220 and an online banking application 221. The memory device 216 also includes a datastore 222 or database for storing pieces of data that can be accessed by the processing device 214.

The third party system 260 includes a communication device 262 and an image capture device (not shown) communicably coupled with a processing device 264, which is also communicably coupled with a memory device 266. The processing device 264 is configured to control the communication device 262 such that the third party system 260 communicates across the network 230 with one or more other systems. The processing device 264 is also configured to access the memory device 266 in order to read the computer readable instructions 268, which in some embodiments includes a transaction application 270. The memory device 266 also includes a datastore 272 or database for storing pieces of data that can be accessed by the processing device 264.

In some embodiments, the capture application 220, the online banking application 221, and the transaction application 270 interact with the OCR engines 250 to receive or provide financial record images and data, detect and extract financial record data from financial record images, analyze financial record data, and implement business strategies, transactions, and processes. The OCR engines 250 and the client keying application 251 may be a suite of applications for conducting OCR.

In some embodiments, the capture application 220, the online banking application 221, and the transaction application 270 interact with the OCR engines 250 to utilize the extracted metadata to determine decisions for exception processing. In this way, the system may systematically resolve exceptions. The exceptions may include one or more irregularities such as bad micro line reads, outdated check stock, or misrepresentative checks that may result in a failure to match the check to an associated account for processing. As such, the system may identify the exception and code it for exception processing. Furthermore, the system may utilize the metadata to match the check to a particular account automatically.

In some embodiments, the capture application 220, the online banking application 221, and the transaction application 270 interact with the OCR engines 250 to utilize the extracted metadata for automated payment stops when detecting a suspect document or time during processing. In this way, the system may identify suspect items within the extracted metadata. The document or check processing may be stopped because of this identification. In some embodiments, the suspect items may be detected utilizing OCR based on data received from a customer external to the document in comparison to the document. In some embodiments, the suspect items may be detected utilizing OCR based on data associated with the account in comparison to the document.

In some embodiments, the capture application 220, the online banking application 221, and the transaction application 270 interact with the OCR engines 250 to utilize the extracted metadata for automated decisions for detecting and/or eliminating duplicate check processing. Duplicate checks may be detected and/or eliminated based on metadata matching. In this way, data may be lifted off of a document as metadata and compare the data to other documents utilizing the metadata form. As such, the system does not have to overlay images in order to detect duplicate documents.

The applications 220, 221, 250, 251, and 270 are for instructing the processing devices 214, 244 and 264 to perform various steps of the methods discussed herein, and/or other steps and/or similar steps. In various embodiments, one or more of the applications 220, 221, 250, 251, and 270 are included in the computer readable instructions stored in a memory device of one or more systems or devices other than the systems 260 and 240 and the user's computing device 211. For example, in some embodiments, the application 220 is stored and configured for being accessed by a processing device of one or more third party systems 292 connected to the network 230. In various embodiments, the applications 220, 221, 250, 251, and 270 stored and executed by different systems/devices are different. In some embodiments, the applications 220, 221, 250, 251, and 270 stored and executed by different systems may be similar and may be configured to communicate with one another, and in some embodiments, the applications 220, 221, 250, 251, and 270 may be considered to be working together as a singular application despite being stored and executed on different systems.

In various embodiments, one of the systems discussed above, such as the financial institution system 240, is more than one system and the various components of the system are not collocated, and in various embodiments, there are multiple components performing the functions indicated herein as a single device. For example, in one embodiment, multiple processing devices perform the functions of the processing device 244 of the financial institution system 240 described herein. In various embodiments, the financial institution system 240 includes one or more of the external systems 296 and/or any other system or component used in conjunction with or to perform any of the method steps discussed herein. For example, the financial institution system 240 may include a financial institution system, a credit agency system, and the like.

In various embodiments, the financial institution system 240, the third party system 260, and the user's computing device 211 and/or other systems may perform all or part of a one or more method steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of method 300, the other methods discussed below, or other methods, processes or steps discussed herein or not discussed herein.

FIG. 4 provides an illustration of an exemplary image of a financial record 300, in accordance with one embodiment of the present invention. The financial record illustrated in FIG. 4 is a check. However, one will appreciate that any financial record, financial document, or the like may be provided.

The image of check 300 may comprise an image of the entire check, a thumbnail version of the image of the check, individual pieces of check information, all or some portion of the front of the check, all or some portion of the back of the check, or the like. Check 300 comprises check information, wherein the check information comprises contact information 305, the payee 310, the memo description 315, the account number and routing number 320 associated with the appropriate user or customer account, the date 325, the check number 330, the amount of the check 335, the signature 340, or the like. In some embodiments, the check information may comprise text. In other embodiments, the check information may comprise an image. A capture device (e.g., the user's computing device 212 of FIG. 3) may capture an image of the check 300 and transmit the image to a system of a financial institution (e.g., the financial institution system 240 of FIG. 3) via a network. The system may collect the check information from the image of the check 300 and store the check information in a datastore as metadata (e.g., the datastore 254 of FIG. 3). In some embodiments, the pieces of check information may be stored in the datastore individually. In other embodiments, multiple pieces of check information may be stored in the datastore together.

FIG. 5 illustrates an exemplary template of a financial record 400, in accordance with one embodiment of the present invention. Again, the financial record illustrated in FIG. 5 is a check. However, one will appreciate that any financial record, financial document, or the like may be provided.

In the illustrated embodiment, the check template 400 corresponds to the entire front portion of a check, but it will be understood that the check template 400 may also correspond to individual pieces of check information, portions of a check, or the like. The check template, in some embodiments, includes the format of certain types of checks associated with a bank, a merchant, an account holder, types of checks, style of checks, check manufacturer, and so forth.

By using the check template, the system of process 100 any other system can "learn" to map the key attributes of the check for faster and more accurate processing. In some embodiments, financial records are categorized by template. The check template 400 is only an exemplary template for a financial record, and other check templates or other financial record templates may be utilized to categorize checks or other financial records. The check template 400 can be used in the OCR processes, image overlay techniques, and the like.

The check template 400 comprises check information, wherein the check information includes, for example, a contact information field 405, a payee line field 410, a memo description field 415, an account number and routing number field 420 associated with the appropriate user or customer account, a date line field 425, a check number field 430, an amount box field 435, a signature line field 440, or the like.

FIG. 6 illustrates a process flow for metadata lifting and utilization for exception processing 500, in accordance with one embodiment of the present invention. As illustrated in block 502 and described in more detail above with respects to FIGS. 1-5, the process 500 is initiated when financial documents, such as checks, are received. The received financial document may be in various forms, such as in an image format. Processing of the document may proceed wherein the data from the document may be collected and lifted from the document as metadata. This metadata is lifted from the document utilizing optical character recognition (OCR). The OCR processes enables the system to convert text and other symbols in the document image to metadata, which can then be used and incorporated into exception processing. In some embodiments, OCR based algorithms used in the OCR processes incorporate pattern matching techniques. For example, each character in an imaged word, phrase, code, or string of alphanumeric text can be evaluated on a pixel-by-pixel basis and matched to a stored character. Various algorithms may be repeatedly applied to determine the best match between the image and stored characters.

Once the metadata is lifted from the document as illustrated in block 502, the process 500 continues to compile and store the metadata associated with the received financial documents, as illustrated in block 504. As such, after the image of the document, such as a check, is processed, the system may compile and store the lifted and collected check information as metadata. As such, individual elements of the check information may be stored separately, together, or the like. In this way, the system stores the type of document, the appearance of the document, the information on the document, such as numbers, accounts, dates, names, addresses, payee, payor, routing numbers, amounts, document backgrounds, or the like as metadata.

In some embodiments, the stored data may be structural metadata. As such, the data may be about the design and specification of the structure of the data. In other embodiments, the data may be descriptive metadata. As such, the data may be data describing in detail the content of the financial record or document. In some embodiments, the metadata as described herein may take the form of structural, descriptive and/or a combination thereof.

Next, as illustrated in decision block 506, the system monitors the received documents to identify exceptions in the document processing. Exceptions may be one or more of irregularities such as bad micro line reads, outdated document stock, misrepresented items, or the like that result in a failure to match the document to an account intended to be associated with that document. If no exception is identified, then the process 500 terminates.

As illustrated in block 507 the process 500 continues to identify and categorize any identified exceptions into financial documents associated with debits or financial documents associated with credits. As illustrated in block 508 the process 500 continues to confirm the irregularity in the financial document that lead to the exception identification in decision block 506. The irregularity that lead to the exception may be one or more of a bad micro line read, outdated documents (such as an outdated check or deposit statement), or a general failure of the document to match an existing financial account.

Next, as illustrated in block 510, the process 500 continues to utilize the metadata associated with the received financial documents to systematically search for exception resolutions. As such, providing automated decisions for exception processing utilizing the lifted metadata. As such, the metadata lifted from the financial documents may be utilized to search the accounts or other records at the financial institution to determine the correct account or record associated with the exception document. For example, the exception may include an outdated check. In this way, one or more of the routing numbers, account numbers, or the like may be incorrectly stated on the check. The system will take the data on that outdated check and convert it to a metadata format. Thus, the system will utilize the metadata format of the routing number or the like to search the financial institution records to identify that that particular routing number was used for a batch of checks for User 1. As such, the system will identify the correct user, User 1 associated with the check that had an exception. Other examples may include one or more of bad micro line reads, document or check format issues, or the like.

As such, the system may utilize the metadata lifted from the document in order to rectify the exception identified in decision block 506. In this way, the system may be able to rectify the exception without having to have an individual manually override the exception and identify the account associated with the document with the exception.

In some embodiments, the system may not be able to identify the correct account associated with the document based on the metadata searching of all financial institution records. As such, as illustrated in block 518, no match is found between the financial document with the exception and the financial institution records. In some embodiments, this may be due to exceptions in the reading process so great that the numbers or letters may not be identified, even partially. In other embodiments, these documents may have one or more altered numbers or letters on the document, flagging it as not being able to be matched to a current financial account at the financial institution. As such, no exception resolution may be identified for that particular exception. Next, as illustrated in block 520, the system may queue the document that is not identified for exception resolution for further investigation by the financial institution.

Referring back to block 512 of FIG. 6, if a match between the financial document with the exception and a financial account or other financial institution record may be made, then the system continues and automatically and systematically corrects the exception based on the match, as illustrated in block 514. In some embodiments, there may be one or more threshold confidences related to the exception. As such, if a match has been made between the metadata and a financial account and it is above a predetermined confidence, then the system may automatically correct the exception. However, in some embodiments, the system may request manual acceptance of the correction of the exception.

Finally, as illustrated in block 516, the corrected financial document may be placed back into the financial document processing for continued processing after the exception has been identified and corrected via systematic searching financial institution data utilizing metadata extracted from the original financial document with an exception.

FIG. 7 illustrates a process flow for metadata lift and utilization for stop payment processing 600, in accordance with one embodiment of the present invention. As illustrated in block 602, the process 500 is initiated when financial documents associated with a payment, such as checks deposits, or the like, are received. As such, these documents are used by a user to transfer a payment or receive a payment. The received financial document associated with a payment may be in various forms, such as in an image format. Processing of the document may proceed wherein the data from the document may be collected and lifted from the document as metadata. This metadata is lifted from the document utilizing optical character recognition (OCR). The OCR processes enables the system to convert text and other symbols in the document image to metadata, which can then be used and incorporated into exception processing. In some embodiments, OCR based algorithms used in the OCR processes incorporate pattern matching techniques. For example, each character in an imaged word, phrase, code, or string of alphanumeric text can be evaluated on a pixel-by-pixel basis and matched to a stored character. Various algorithms may be repeatedly applied to determine the best match between the image and stored characters.

Once the metadata is lifted from the document associated with a payment, as illustrated in block 602, the process 600 continues to compile and store the metadata associated with the received financial documents, as illustrated in block 604. As such, after the image of the document, such as a check, is processed, the system may compile and store the lifted and collected check information as metadata. As such, individual elements of the check information may be stored separately, together, or the like.

Next, as illustrated in block 606, once the system receives a document associated with a payment, the system matches the lifted metadata from that document to the account to complete and process the payment associated with that document.

In some embodiments, as illustrated in block 608, the system may identify issues with the documents that suggest that the documents should not be processed for payments. For example, the documents may not match user provided data such as user account information or the like.

In some embodiments, as illustrated in block 610, the system may receive an indication from a user requesting a stop payment of the financial document. The user indication may be a telephone communication, text communication, electronic communication, or in person communication. The user may provide the system via a representative with one or more identifiers associated with the document. For example, the user may wish to issue a stop payment on a check he/she wrote. The user may only know one of the amount, payee, date, or the like. The system may take this information from the user, convert it to metadata and utilize that metadata to search the financial institution to identify the specific document and the account associated with the user's provided information. As such, as illustrated in block 612 the system identifies the financial document requested for stop payment based on the user provided information. This is done by converting the user provided information into metadata and searching the user provided data against the metadata lifted from the document to identify a match. In some embodiments, the user provided information is matched to the lifted metadata associated with received financial documents associated with payments from block 602.

Next, as illustrated in block 614 the system may stop payment of the financial document in response to identifying the document that was identified to not have a match to an account, as illustrated in block 608, or the documents requested by a user to issue a stop payment, as illustrated in block 612. Finally, the process 600 continues to follow up with the financial institution and user regarding the stopped payment financial document, as illustrated in block 616. In this way, the system ensures that there was a stop payment issued and no further action is required.

FIG. 8 illustrates a process flow for metadata lift and utilization for duplicate identification and processing 700, in accordance with one embodiment of the present invention. As illustrated in block 702, the process 700 is initiated when financial documents are received. The received financial document may be in various forms, such as in an image format. Processing of the document may proceed wherein the data from the document may be collected and lifted from the document as metadata. This metadata is lifted from the document utilizing optical character recognition (OCR). The OCR processes enables the system to convert text and other symbols in the document image to metadata, which can then be used and incorporated into exception processing. In some embodiments, OCR based algorithms used in the OCR processes incorporate pattern matching techniques. For example, each character in an imaged word, phrase, code, or string of alphanumeric text can be evaluated on a pixel-by-pixel basis and matched to a stored character. Various algorithms may be repeatedly applied to determine the best match between the image and stored characters.

Once the metadata is lifted from the document as illustrated in block 702, the process 700 continues to compile and store the metadata associated with the received financial documents, as illustrated in block 704. As such, after the image of the document is processed, the system may compile and store the lifted and collected information as metadata. As such, individual elements of the document, such as a check, may be stored separately, together, or the like. In this way, the system stores the type of document, the appearance of the document, the information on the document, such as numbers, accounts, dates, names, addresses, payee, payor, routing numbers, amounts, document backgrounds, or the like as metadata.

In some embodiments, the stored data may be structural metadata. As such, the data may be about the design and specification of the structure of the data. In other embodiments, the data may be descriptive metadata. As such, the data may be data describing in detail the content of the financial record or document. In some embodiments, the metadata as described herein may take the form of structural, descriptive and/or a combination thereof.

Next, as illustrated in block 706, the metadata lifted from the received documents is compared against metadata associated with previously stored financial documents. In this way, the system may identify if one or more received financial documents are duplicate documents to those already stored within the system.

As illustrated in block 708, the system may identify a duplicate financial documents based on the metadata comparison. As such, the received document may be a duplicate of a document that has already been received and is stored as metadata within the financial institution. In some embodiments, the system may eliminate the duplicate financial document. In other embodiments, the system may notify the user of the duplicate financial document. In yet other embodiments, the system may be both eliminate the duplicate and notify the user of the duplicate. As such, as illustrated in block 710 the user may be informed of the duplicate and/or the identified duplicate may be eliminated and no longer processed. Finally, as illustrated in block 712, the system may follow on the duplicate document to ensure its elimination.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, or the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a verity of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, or the like) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computer program product for exception processing of financial documents, the computer program product comprising at least one non-transitory computer-readable medium having computer-readable program code portions embodied therein, the computer-readable program code portions comprising:

an executable portion configured for receiving an indication of a user transaction, wherein receiving an indication of the user transaction comprises receiving a copy of one or more financial documents associated with the user transaction for processing;

an executable portion configured for identifying data from the financial document, wherein the data from the financial document is extracted from the financial document using optical character recognition and the data is stored as metadata;

an executable portion configured for processing the financial document by identifying exceptions in the meta data for the financial document being processed, wherein identifying exceptions further comprises identifying a type of financial document as a credit document or a debit document;

an executable portion configured for determining known data associated with financial accounts of a user based on the metadata, wherein the financial accounts are identified by comparing the metadata that is not associated with the exception to the financial institution records to generate the known data;

an executable portion configured for comparing the exceptions identified in the metadata associated with the financial document to the known data associated with the financial accounts of the user;

an executable portion configured for matching an appropriate financial account to the financial document comprising exceptions, wherein the match is based on the comparison between the extracted metadata from the financial document comprising exceptions to known data associated with financial accounts;

an executable portion configured for identifying one or more resolutions associated with the identified exception, wherein identifying one or more resolutions further comprises comparing the extracted metadata with data associated with either financial institution records or financial accounts of the user and correcting, automatically, the identified exceptions in the financial documents based on the one or more resolutions.

2. The computer program product of claim 1, wherein processing the financial documents further comprises directing a financial document without an exception to an appropriate financial account associated with the financial document such that payment for the user transaction associated with the financial document is completed.

3. The computer program product of claim 1, wherein comparing the extracted metadata from the financial document comprising exceptions to known data associated with financial accounts further comprises:

compiling metadata associated with complete portions of the financial document comprising exceptions.

4. The computer program product of claim 3, wherein comparing the extracted metadata from the financial document comprising exceptions to known data associated with financial accounts further comprises:

compiling metadata associated with partially extracted portions or exception portion from the financial document comprising exceptions.

5. The computer program product of claim 4, wherein comparing the extracted metadata from the financial document comprising exceptions to known data associated with financial accounts further comprises:

comparing both the metadata associated with complete portions of the financial document and metadata associated with partially extracted portions of the financial document to known data associated with financial accounts.

6. The computer program product of claim 5, wherein comparing the extracted metadata from the financial document comprising exceptions to known data associated with financial accounts further comprises:

determining a match between a known financial account and the financial document comprising exceptions based on the comparison of both complete and partial portions of the financial document comprising exceptions.

7. The computer program product of claim 1, wherein identifying data from the transaction documents associated with the user transaction further comprises capturing via optical character recognition, images of various elements of the transaction documents, wherein the various elements are unique to the transaction documents, wherein the identified data is stored as metadata.

8. The computer program product of claim 7, wherein elements of the financial document that comprise the identified data includes one or more of a payor name, a payee name, date, payment amount, account number, or routing number.

9. The computer program product of claim 1, wherein the financial documents comprise one or more of a check, deposit ticket, automated teller machine (ATM) receipt, or general ledger ticket.

10. The computer program product of claim 1, wherein exceptions comprise one or more irregularities in the financial documents such as bad micro line reads, outdated check stock, or misrepresentative checks.

11. The computer program product of claim 1, wherein correcting, automatically, the identified exceptions in the financial documents further comprises:

determining a confidence rating for each of the one or more resolutions, based on comparing the extracted metadata with the data associated with financial institution records; and transmitting an authorization request to an external system, based on determining that the confidence rating associated with the one or more exceptions is below a predetermined threshold.

12. The computer program product of claim 1, wherein metadata comprises both structural and descriptive metadata, wherein the structural and descriptive metadata includes design, specification, and details from the financial document relating to one or more of account data, dates, payee, payor, addresses, routing numbers, or payment amounts.

13. A computer-implemented method for exception processing of financial documents, the method comprising:

providing a computing system comprising a computer processing device and a non-transitory computer readable medium, where the computer readable medium comprises configured computer program instruction code, such that when said instruction code is operated by said computer processing device, said computer processing device performs the following operations:

receiving an indication of a user transaction, wherein receiving an indication of the user transaction comprises receiving a copy of one or more financial documents associated with the user transaction for processing;

identifying data from the financial document, wherein the data from the financial document is extracted from the financial document using optical character recognition and the data is stored as metadata;

processing the financial document by identifying exceptions in the metadata for the financial document being processed, wherein identifying exceptions further comprises identifying a type of financial document as a credit document or a debit document;

determining known data associated with financial accounts of a user based on the metadata, wherein the financial accounts are identified by comparing the metadata that is not associated with the exception to the financial institution records to generate the known data;

comparing, via a computer processing device, the exceptions identified in the metadata associated with the financial document to the known data associated with the financial accounts of the user;

matching an appropriate financial account to the financial document comprising exceptions, wherein the match is based on the comparison between the extracted metadata from the financial document comprising exceptions to known data associated with financial accounts;

identifying one or more resolutions associated with the identified exceptions in the financial documents, wherein identifying one or more resolutions further comprises comparing the extracted metadata with data associated with either financial institution records or financial accounts of the user; and correcting, automatically, the identified exceptions in the financial documents based on the one or more resolutions.

14. The computer-implemented method of claim 13, wherein processing the financial documents further comprises directing a financial document without an exception to an appropriate financial account associated with the financial document such that payment for the user transaction associated with the financial document is completed.

15. The computer-implemented method of claim 13, wherein comparing the extracted metadata from the financial document comprising exceptions to known data associated with financial accounts further comprises:

compiling metadata associated with complete portions of the financial document comprising exceptions.

16. The computer-implemented method of claim 15, wherein comparing the extracted metadata from the financial document comprising exceptions to known data associated with financial accounts further comprises:

compiling metadata associated with partially extracted portions or exception portion from the financial document comprising exceptions.

17. The computer-implemented method of claim 16, wherein comparing the extracted metadata from the financial document comprising exceptions to known data associated with financial accounts further comprises:

compare both the metadata associated with complete portions of the financial document and metadata associated with partially extracted portions of the financial document to known data associated with financial accounts.

18. The computer-implemented method of claim 17, wherein comparing the extracted metadata from the financial document comprising exceptions to known data associated with financial accounts further comprises:

determine a match between a known financial account and the financial document comprising exceptions based on the comparison of both complete and partial portions of the financial document comprising exceptions.

19. The computer-implemented method of claim 13, wherein identifying data from the transaction documents associated with the user transaction further comprises capturing via optical character recognition, images of various elements of the transaction documents, wherein the various elements are unique to the transaction documents, wherein the identified data is stored as metadata.

20. The computer-implemented method of claim 19, wherein elements of the financial document that comprise the identified data includes one or more of a payor name, a payee name, date, payment amount, account number, or routing number.

21. The computer-implemented method of claim 13, wherein exceptions comprise one or more irregularities in the financial documents such as bad micro line reads, outdated check stock, or misrepresentative checks and wherein correcting, automatically, the identified exceptions in the financial documents further comprises:
  determining a confidence rating for each of the one or more resolutions, based on comparing the extracted metadata with the data associated with financial institution records; and
  transmitting an authorization request to an external system, based on determining that the confidence rating associated with the one or more exceptions is below a predetermined threshold.

22. The computer-implemented method of claim 13, wherein metadata comprises both structural and descriptive metadata, wherein the structural and descriptive metadata includes design, specification, and details from the financial document relating to one or more of account data, dates, payee, payor, addresses, routing numbers, or payment amounts.

* * * * *